(12) United States Patent
Bala et al.

(10) Patent No.: US 8,837,830 B2
(45) Date of Patent: Sep. 16, 2014

(54) FINDING TEXT IN NATURAL SCENES

(75) Inventors: Raja Bala, Webster, NY (US); Zhigang Fan, Webster, NY (US); Hengzhou Ding, Webster, NY (US); Jan P. Allebach, West Lafayette, IN (US); Charles A. Bouman, West Lafayette, IN (US)

(73) Assignee: Xerox Corporation, Norwalk, CT (US)

( * ) Notice: Subject to any disclaimer, the term of this patent is extended or adjusted under 35 U.S.C. 154(b) by 192 days.

(21) Appl. No.: 13/494,173

(22) Filed: Jun. 12, 2012

(65) Prior Publication Data
US 2013/0330004 A1 Dec. 12, 2013

(51) Int. Cl.
*G06K 9/34* (2006.01)

(52) U.S. Cl.
USPC .......................................... 382/176

(58) Field of Classification Search
CPC .............................. G06K 9/4638; G06T 7/0083
USPC ............................. 382/164, 176, 180; 358/462
See application file for complete search history.

(56) References Cited

U.S. PATENT DOCUMENTS

| | | | | |
|---|---|---|---|---|
| 4,791,675 A * | 12/1988 | Deering et al. | ............... | 382/194 |
| 5,350,303 A * | 9/1994 | Fox et al. | ...................... | 434/118 |
| 5,583,949 A * | 12/1996 | Smith et al. | .................... | 382/199 |
| 5,757,957 A * | 5/1998 | Tachikawa | ..................... | 382/176 |
| 6,233,364 B1 * | 5/2001 | Krainiouk et al. | ............ | 382/275 |
| 8,098,891 B2 * | 1/2012 | Lv et al. | ......................... | 382/103 |
| 8,233,668 B2 * | 7/2012 | Jing et al. | ...................... | 382/110 |
| 2002/0102022 A1 * | 8/2002 | Ma et al. | ....................... | 382/170 |
| 2003/0095113 A1 * | 5/2003 | Ma et al. | ....................... | 345/175 |
| 2003/0198386 A1 * | 10/2003 | Luo | ............................... | 382/199 |
| 2006/0015571 A1 * | 1/2006 | Fukuda et al. | ................. | 709/217 |
| 2007/0110322 A1 * | 5/2007 | Yuille et al. | .................... | 382/227 |
| 2008/0002893 A1 * | 1/2008 | Vincent et al. | ................ | 382/229 |
| 2009/0067709 A1 * | 3/2009 | Gross et al. | .................... | 382/166 |
| 2009/0169105 A1 * | 7/2009 | Song et al. | ..................... | 382/173 |
| 2009/0285482 A1 * | 11/2009 | Epshtein et al. | ............... | 382/176 |
| 2010/0157340 A1 * | 6/2010 | Chen et al. | ..................... | 358/1.9 |
| 2010/0246951 A1 * | 9/2010 | Chen et al. | ..................... | 382/167 |
| 2011/0098029 A1 * | 4/2011 | Rhoads et al. | ................. | 455/418 |
| 2012/0045132 A1 * | 2/2012 | Wong et al. | .................... | 382/195 |
| 2013/0127824 A1 * | 5/2013 | Cohen et al. | ................... | 345/419 |

OTHER PUBLICATIONS

Kumar et al. ("Text detection using multilayer separation in real scene images," 10th IEEE Int'l Conf. Computer and Information Technology, 2010, pp. 1413-1417).*

(Continued)

*Primary Examiner* — Yubin Hung
(74) *Attorney, Agent, or Firm* — Fay Sharpe LLP

(57) ABSTRACT

As set forth herein, systems and methods facilitate providing an efficient edge-detection and closed-contour based approach for finding text in natural scenes such as photographic images, digital, and/or electronic images, and the like. Edge information (e.g., edges of structures or objects in the images) is obtained via an edge detection technique. Edges from text characters form closed contours even in the presence of reasonable levels of noise. Closed contour linking and candidate text line formation are two additional features of the described approach. A candidate text line classifier is applied to further screen out false-positive text identifications. Candidate text regions for placement of text in the natural scene of the electronic image are highlighted and presented to a user.

19 Claims, 15 Drawing Sheets
(10 of 15 Drawing Sheet(s) Filed in Color)

(56) References Cited

OTHER PUBLICATIONS

Chen et al. ("Robust Text Detection in Natural Images with Edge-enhanced Maximally Stable Extremal Regions," IEEE International Conference on Image Processing (ICIP), Sep. 2011).*

Yi et al. ("Text String Detection From Natural Scenes by Structure-Based Partition and Grouping," IEEE Trans. Image Processing, vol. 20, No. 9, Sep. 2011, 2594-2605).*

Russell et al. ("Using multiple segmentations to discover objects and their extent in image collections," IEEE CVPR, 2006).*

Gao et al. ("An adaptive algorithm for text detection from natural scenes," Proceedings of the IEEE Conference on Computer Vision and Pattern Recognition, Dec. 2001, 6 pages).*

K. Jung et al., "Text Information Extraction in Images and Video: A Survey" Pattern Recognition, vol. 37, No. 5, pp. 977-997, May 2004.

C. C. Anagnostopoulos et al., "License Plate Recognition from Still Images and Video Sequences: A Survey" IEEE Trans. Intel. Transport. Sys. vol. 9, No. 3, pp. 377-391, Sep. 2008.

J. Friedman et al., "Additive Logistic Regression: A Statistical View of Boosting" The Annals of Statistics, vol. 28, No. 2, pp. 337-407, 2000.

\* cited by examiner (BEFORE) (AFTER)

FINDING TEXT IN NATURAL SCENES

TECHNICAL FIELD

The present exemplary embodiments broadly relate to text detection in electronic images. However, it is to be appreciated that the present exemplary embodiments are also amenable to other like applications.

BACKGROUND

The personalization and customization of images as a way to add value to documents has been gaining interest in recent times. This is especially true in transactional and promotional marketing applications, but also is gaining traction in more image-intensive markets such as photo finishing, whereby personalized calendars, photobooks, greeting cards, and the likes are created. One approach to personalize an image is to incorporate a personalized text message into the image, with the effect that the text is a natural part of the image. Several technologies currently exist to personalize images in this fashion, offered by vendors such as XMPie, DirectSmile, and AlphaPictures, for example. In such applications, a photorealistic result is intended to convey the intended effect. At the same time, these approaches are cumbersome and complicated, requiring sophisticated design tools, and designer input with image processing experience. For this reason, designers are often hired to create libraries of stock personalization templates for customers to use. This limits the images that the customer can draw from for personalization.

A natural choice for incorporating personalized text into an image is a location where text already exists, such as a street sign, store sign or banner. The automatic detection of text in images is a very interesting and broadly studied problem. The problem can be further grouped into two subcategories, which include detecting and recognizing text in documents and finding text in natural scenes. Document text detection has been tackled by researchers, and is a precursor to optical character recognition (OCR) and other document recognition technologies. However, text detection techniques applicable to documents work at best poorly, and often not at all, on text found in real image scenes, As the text can typically bear different perspectives and can vary significantly in many different respects, such as size, location, shading, font, etc. Furthermore, the detection algorithm may be confused by other details and structures in the image. State-of-the-art techniques generally make assumptions and thus constrain themselves to a subset of the general problem. For example, in license plate recognition, the license plate images are usually obtained in a controlled environment with little variation in perspective, location, angle, distance, etc. Furthermore, many of these algorithms are computationally costly, which renders them ill-suited for real-time or interactive applications.

What are therefore needed are convenient and automated systems and methods that facilitate automatically detecting text regions in natural scenes in electronic images for use in image personalization and other applications.

BRIEF DESCRIPTION

In one aspect, a computer-implemented method for automatically detecting text in electronic images of natural scenes comprises receiving an electronic image for analysis, performing an edge-detection algorithm on the electronic image, identifying closed contours in the electronic image as a function of detected edges, and establishing links between closed components. The method further comprises identifying candidate text lines as a function of the identified closed contours, classifying candidate text lines as being text or non-text regions, and outputting, via a graphical user interface (GUI), verified text regions in the electronic image to a user.

According to another aspect, a computerized system that facilitates automatically detecting text in electronic images of natural scenes comprises a memory that stores computer-executable instructions, and a processor configured to execute the instructions, the instructions comprising receiving an electronic image for analysis, performing an edge-detection algorithm on the electronic image, and identifying closed contours in the electronic image as a function of detected edges. The processor is further configured to execute stored instructions for establishing links between closed components, identifying candidate text lines as a function of the identified closed contours, and classifying candidate text lines as being text or non-text regions. The system further includes a graphical user interface (GUI) on which verified text regions in the electronic image are displayed to a user.

BRIEF DESCRIPTION OF THE DRAWINGS

The file of this patent contains at least one drawing executed in color. Copies of this patent with color drawing(s) will be provided by the United States Patent and Trademark Office upon request and payment of the necessary fee.

DETAILED DESCRIPTION

Figure 1:
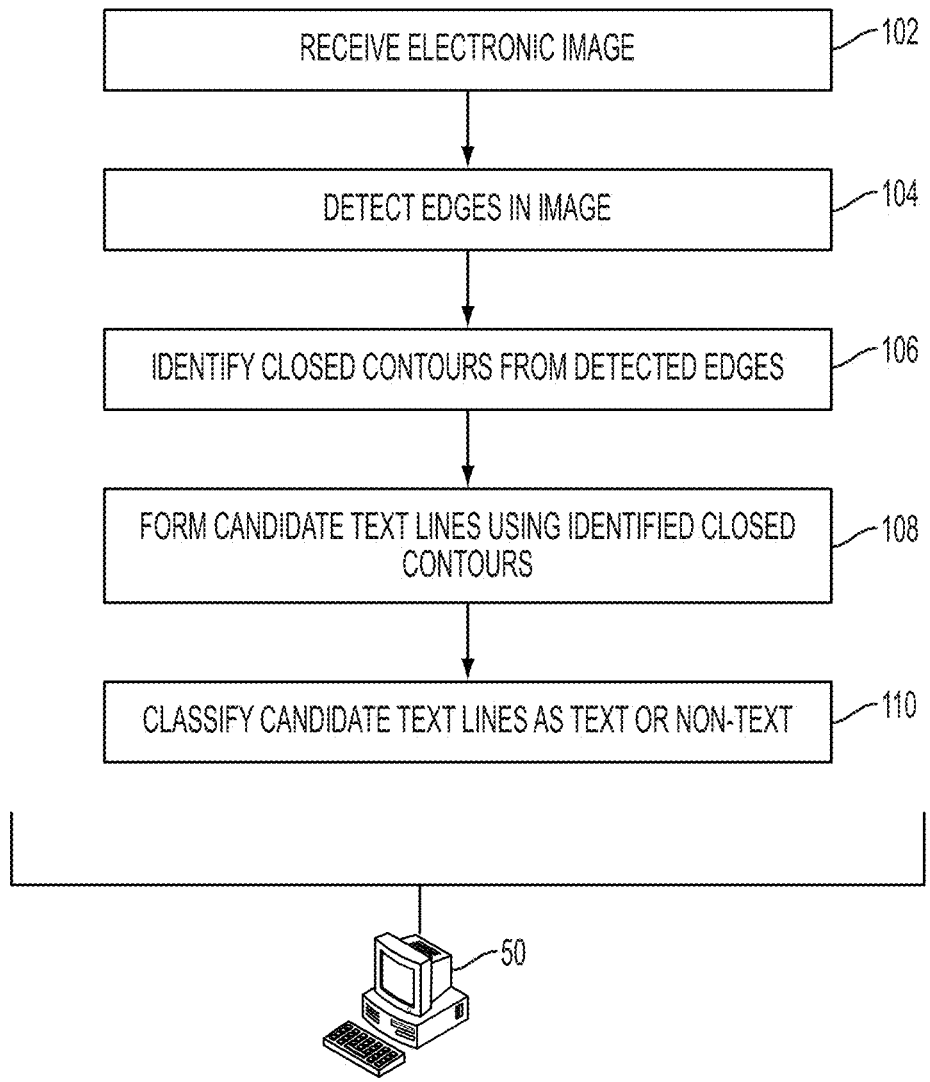
FIG. 1 illustrates a methodology for automatically detecting text regions in an image.

The systems and methods described herein provide an efficient approach for finding text in natural scenes such as photographic images, digital and/or electronic images, and the like. The described approach exploits edge information (e.g., edges of structures or objects in the images) that can be obtained from known edge detection techniques or algorithms. The approach understands that edges from text characters form closed contours even with presence of reasonable levels of noise. Closed contour linking and candidate text line forming are two additional features of the described approach that will be presented in additional detail herein. Finally, a candidate text line classifier is applied to further screen out false-positive text identifications.

The herein described systems and methods find potential application in several domains. One example is image personalization, where in a personalized text message is incorporated into the image as a natural effect. This invention can be used to identify for the user those regions in the image containing existing text that can be potentially replaced with a personalized message. The invention is also used as a smart preprocessing step towards assessing the "suitability for personalization" (SFP) metric of an image, which is described in greater detail in U.S. patent application Ser. No. 13/349,751, entitled "Methods and system for analyzing and rating images for personalization", filed on Jan. 13, 2012, the entirety of which is hereby incorporated by reference herein). Briefly summarized, in determining if an image is suited for text-based personalization, locations containing existing text (e.g. signage, banners, and the like) typically provide an important indication as they suggest natural image regions for placing personalized text messages. Thus, the ability to accurately and efficiently find text embedded in natural scenes is useful for determining an effective SFP and for serving as a design aid in image personalization. Many other applications are envisioned, e.g. image understanding and recognition, security, surveillance, license plate recognition, etc. Text region detection depends on the application in which the described approach is used. For example, in image personalization, the identified text regions can be visibly (to a user) marked up or highlighted and presented to the user via a graphical user interface (GUI) on or associated with a computer 50.

The computer 50 can be employed as one possible hardware configuration to support the systems and methods described herein. It is to be appreciated that although a standalone architecture is illustrated, any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The computer 50 includes a processing unit (not shown) that executes, and a system memory (not shown) that stores, one or more sets of computer-executable instructions (e.g., modules, programs, routines, algorithms, etc.) for performing the various functions, procedures, methods, protocols, techniques, etc., described herein. The computer can further include a system bus (not shown) that couples various system components including the system memory to the processing unit. The processing unit can be any of various commercially available processors. Dual microprocessors and other multiprocessor architectures also can be used as the processing unit.

As used herein, "algorithm" or "module" refers to a set of computer-executable instructions persistently stored on a computer-readable medium (e.g., a memory, hard drive, disk, flash drive, or any other suitable storage medium). Moreover, the steps of the methods described herein are executed by a computer and/or processor unless otherwise specified as being performed by a user.

The computer 50 typically includes at least some form of computer readable media. Computer readable media can be any available media that can be accessed by the computer. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A user may enter commands and information into the computer through a keyboard (not shown), a pointing device (not shown), a mouse, thumb pad, voice input, stylus, touchscreen, etc. The computer 50 can operate in a networked environment using logical and/or physical connections to one or more remote computers, such as a remote computer(s). The logical connections depicted include a local area network (LAN) and a wide area network (WAN). Such networking environments are commonplace in offices, enterprise-wide computer networks, intranets and the Internet.

FIG. 1 illustrates a methodology for automatically detecting text regions in an image. The method is executed by the computer 50. At 102, an electronic image (e.g., a scanned photograph, a digital image, or any other suitable electronic image) is received. At 104, edges in the detected image are detected. In one example, Canny's edge detection algorithm is executed or performed to detect edges in the image, although it will be appreciated that any suitable edge detection algorithm or technique can be applied in conjunction with the herein-described methods and systems. At 106, closed contours are identified using the detected edges. At 108, candidate text lines are formed from the identified closed contours. At 110, the candidate text lines are classified as text or non-text regions.

Figure 2:
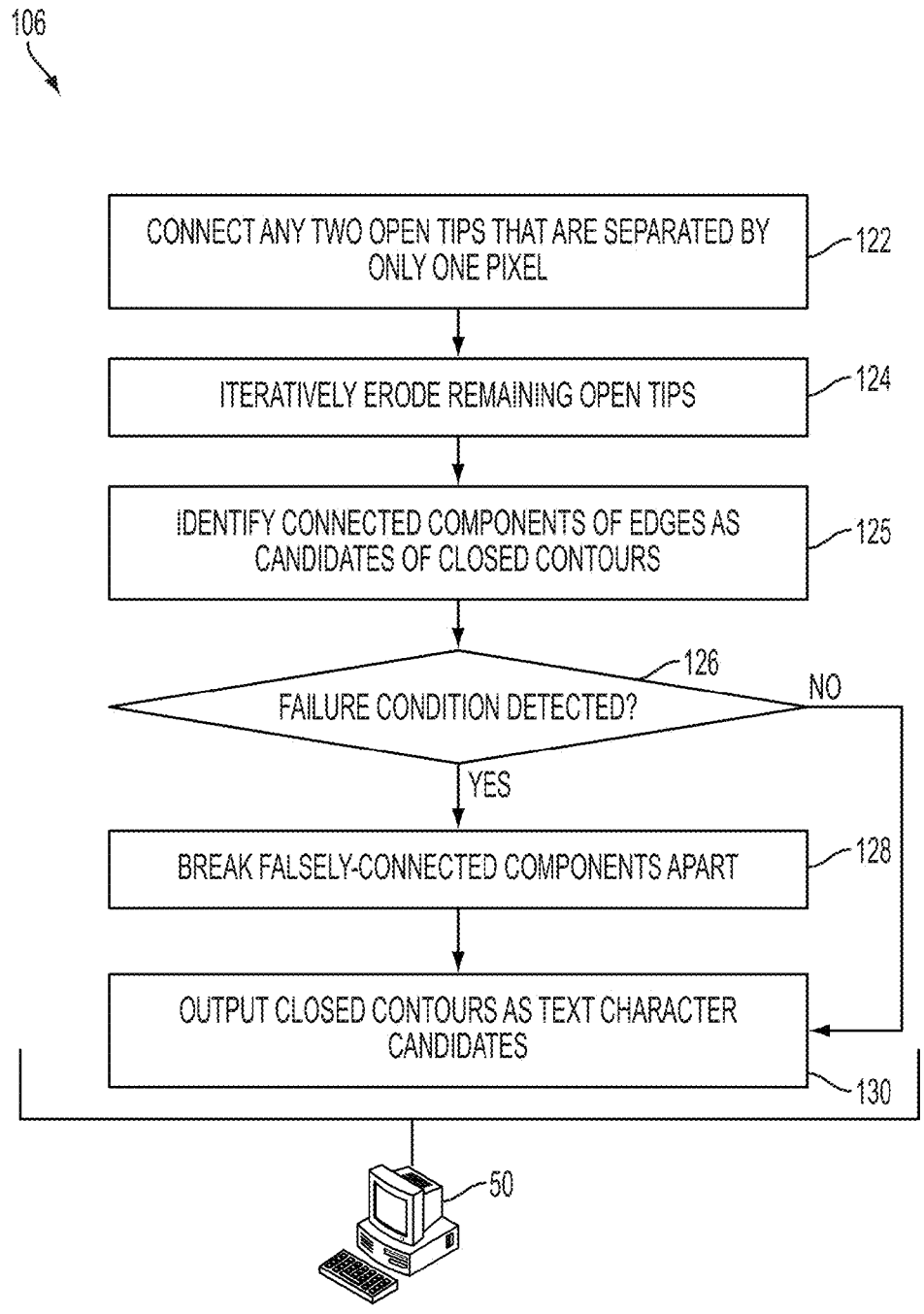
FIG. 2 illustrates a method of closed contour identification.

FIG. 2 illustrates a method of closed contour identification as described with regard to 106 of FIG. 1, in greater detail. The method is executed by the computer 50. At 122, open tips of the closed contour that are separated by a distance smaller than a threshold $T_{open}$ are connected to form an edge. At 124, remaining open tips are iteratively eroded (e.g., using a known morphological erosion technique or the like). At 125, connected components of edges are identified as candidates of closed contours. At 126, a determination is made regarding a false-positive condition has occurred, such as where two closed contours are attached to each other by a single edge. If so, then at 128, such falsely-connected components are broken apart. Once the falsely-connected components have been broken apart, or if the determination at 126 indicates that no false-positive conditions are present, then at 130, the identified closed contours are output as text character candidates.

With continued reference to FIGS. 1 and 2 and the methods described with regard thereto, FIGS. 3-8 and the related description illustrate examples of one or more steps or acts performed with regard to the methods of FIGS. 1 and 2.

Figure 3:
FIG. 3 illustrates an example of an input image.

FIG. 3 illustrates an example of an image 150 for which the method of FIG. 1 can be employed to identify lines of text in the image.

Figure 4:
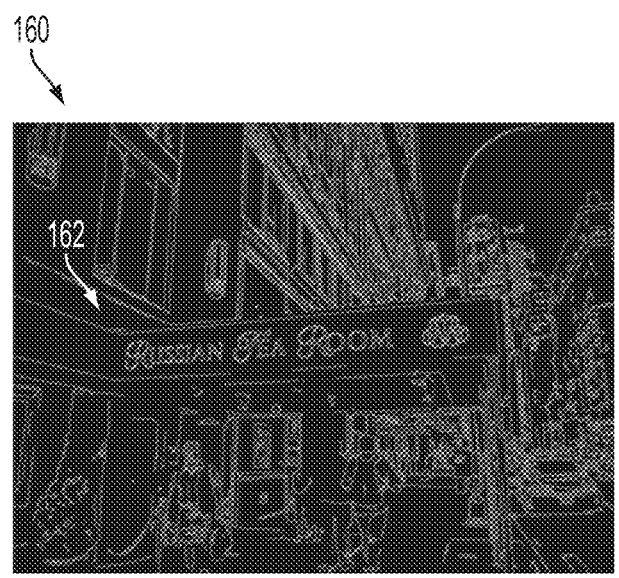
FIG. 4 illustrates an edge map obtained by applying an edge detection algorithm.
Figure 5:
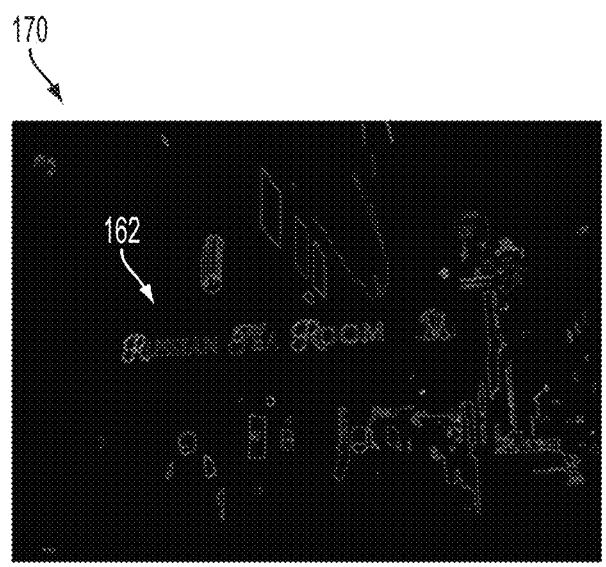
FIG. 5 illustrates a refined edge map containing closed contours generated by the herein-described closed contour identification method.

FIG. 4 illustrates an edge map 160 obtained by applying the edge detection algorithm (e.g., Canny's algorithm or the like) at 104. The objective is to detect the text "Russian Tea Room." However, detecting the text is challenging because it is buried in the crowded edge map 160 due to other details and structures in the image. However, it will be noted that edge contours from text characters frequently self-close. In other words, the contours for text characters are closed whereas edges from other structures typically get broken up due to a variety of reasons such as obstruction, low contrast, etc. Consequently, two post-processing steps are applied to remove excessive edge details while preserving closed contours 162, the result of which is shown in the refined edge map 170 in FIG. 5.

Figure 6:
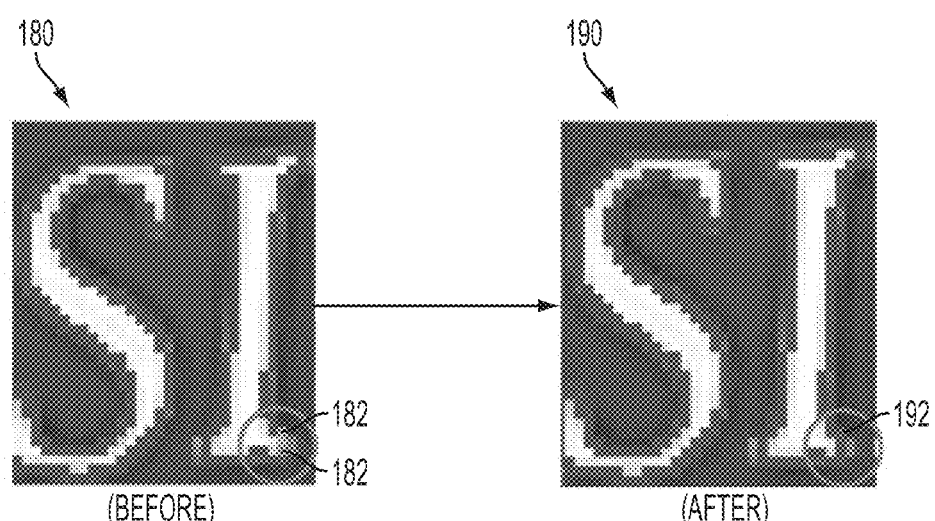
FIG. 6 illustrates before-and-after images in which a post-processing step has identified and connected two open tips that are separated by only one pixel.
Figure 7:
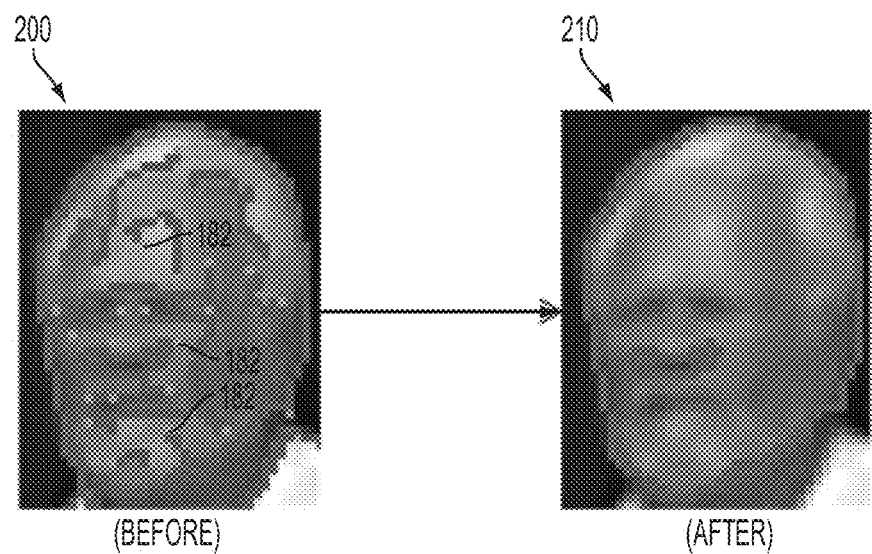
FIG. 7 illustrates before-and-after images in which a post-processing step has iteratively eroded remaining open tips until no open tips exist in the edge map.

FIGS. 6 and 7 illustrate the aforementioned two post-processing steps. Since the algorithm seeks to detect closed contours, open tips of the closed contours are searched for first. Examples of open tips are the green pixels in FIGS. 6 and 7. As illustrated in FIG. 6, in a "before" image 180, a pair of open tips 182 are identified (e.g., at 122 of FIG. 2). The first post-processing step 122 (FIG. 2) tries to connect any two open tips 182 that are separated by only 1 pixel. This step aims at closing small gaps in edge contours of text characters due to presence of noise. In FIG. 6, the contour for the character "I" is successfully closed to generate the "after" image 190 in which the open tips 182 have been closed to form an edge 192.

FIG. 7 shows a before image 200 and an after image 210 in which the second post-processing step (124 of FIG. 2) iteratively erodes remaining open tips 182, until no open tips exist in the edge map. Most of the edges on the man's face in the after image 210 are cleared after erosion.

Referring back to FIG. 5, once the steps of connecting open tips (122) and erosion (124) are complete, the refined edge map (see, e.g., FIG. 5) is output. It will be noted that many of the non-text edges in the refined edge map have been eliminated. Note that the connected component analysis is also carried out on the edge map of FIG. 5, where color coding is utilized to indicate each connected component of closed contours.

Figure 8:
FIG. 8 illustrates an example of an image in which is detected a "failure mode" where two closed contours are attached to each other by a single edge.

FIG. 8 illustrates an example of an image 220 in which a "failure mode" (e.g., a falsely-closed contour) is detected where two closed contours are attached to each other by a single edge. As shown in FIG. 8, even after steps 122 and 124, the character "B" in the word "NOBODY" is still attached to some other details in the image, while the character "S" in the word "GETS" and the character "H" in the word "HURT" are also mutually attached. No open tips remain in FIG. 8, yet the false positive closed component is detected. Additional post-processing steps 126 and 128 (FIG. 2) are provided for addressing this issue. That is, if the determination at 126 indicates that falsely-connected closed contours are present, the algorithm, at 128, attempts to break such falsely-attached closed contours apart.

Figure 9:
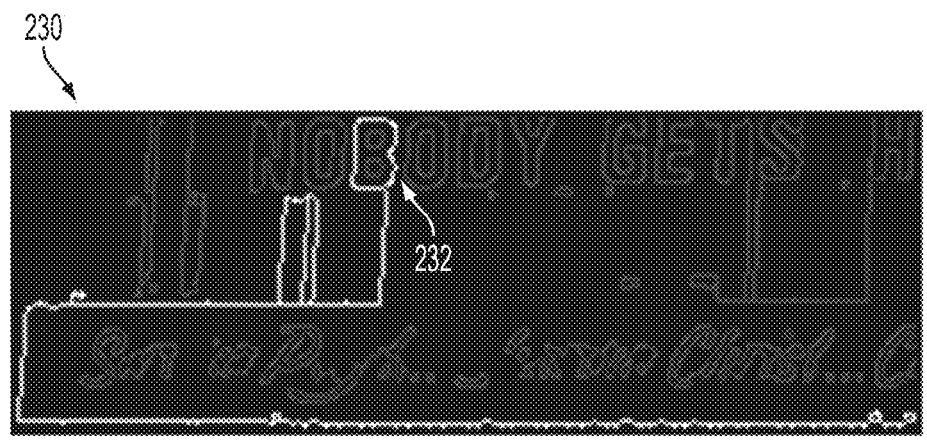
FIG. 9 illustrates a problematic edge set as an example, which can be corrected by the herein-described techniques.

FIG. 9 illustrates a problematic edge set 230 as an example. The edge pixels from the falsely-attached closed contours 232 are shown in white, while other edge pixels are shown in grey. When executing the algorithm at 128 (FIG. 2), the boundary of the bounding box is analyzed, and all background pixels are marked out by connected component analysis.

Figure 10:
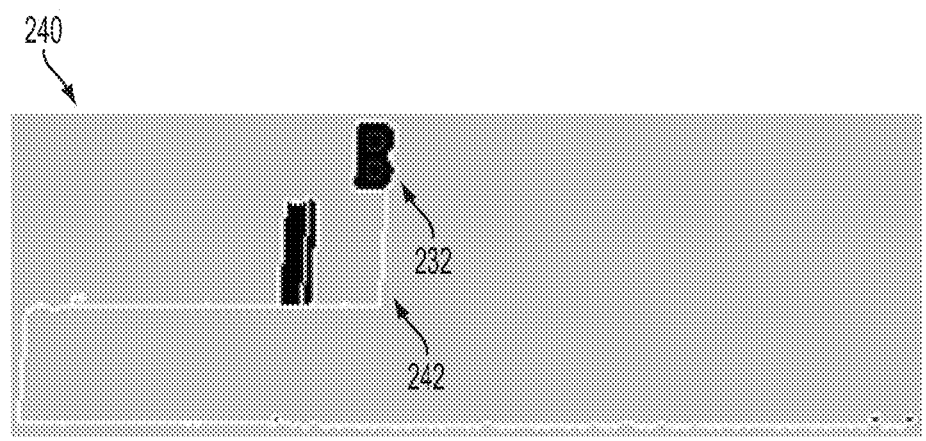
FIG. 10 illustrates a resulting edge set in which all background pixels that surround the closed contours have been marked light grey.

FIG. 10 illustrates a resulting edge set 240 in which all background pixels that surround the contours 232 have been marked light grey. As can be seen in FIG. 10, there is a difference between the edge pixels of the closed contours 232 and the edge pixels that link closed contours. The edge pixels of the closed contours separate background pixels (light grey) from interior pixels (black) of the closed contour 232, while the edge pixels 242 that link closed contours simply separate two portions of background pixels. Based on this observation, the algorithm can successfully remove the edge pixels that link closed contours, and break closed contours apart, at 128 (FIG. 2).

Figure 11:
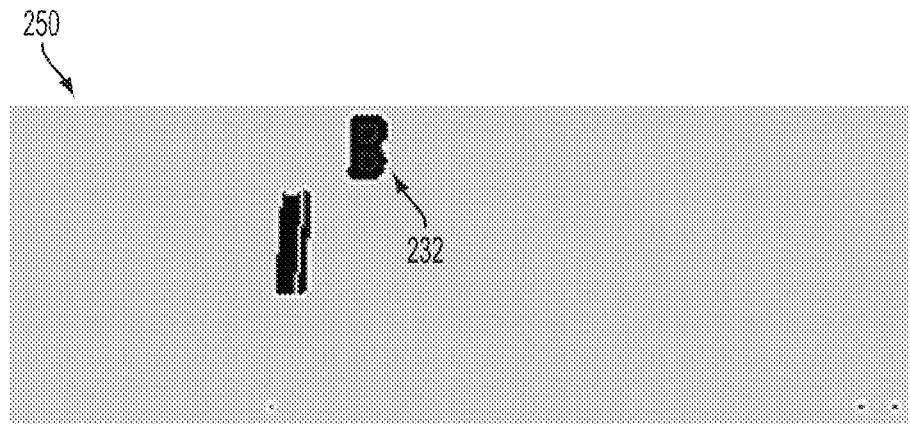
FIG. 11 shows an edge set in which the character "B" is successfully separated from falsely-connected contours.

FIG. 11 shows an edge set 250 in which the character "B" is successfully separated. It will be noted that inside the closed contour 232 of "B", there are two isolated circles which also belong to "B" logically. They are combined with the contour of "B" in the last step.

Figure 12:
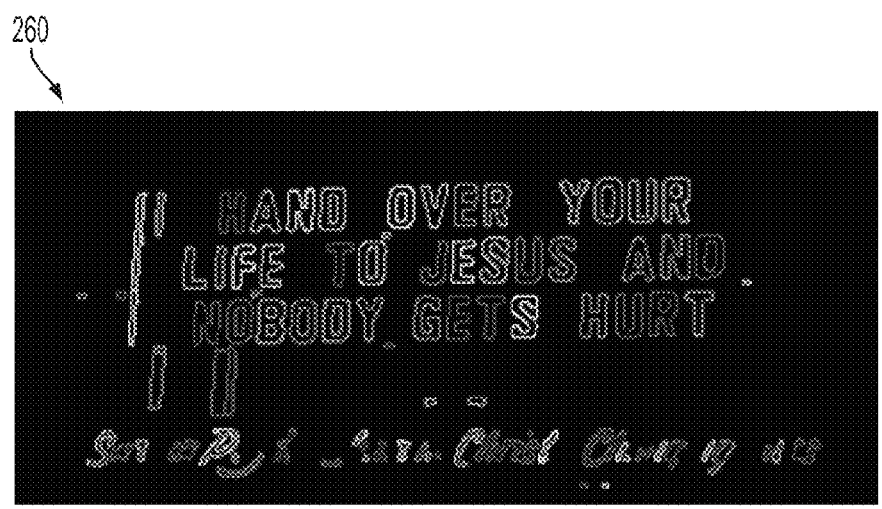
FIG. 12 shows a refined edge map after applying additional post-processing steps.

FIG. 12 shows a refined edge map 260 after applying the additional post-processing steps 126 128 (FIG. 2). In FIG. 12, each of the closed contours is regarded as a text character candidate and color coded differently for ease of viewing, such as is performed at 130 of the method of FIG. 2.

Figure 13:
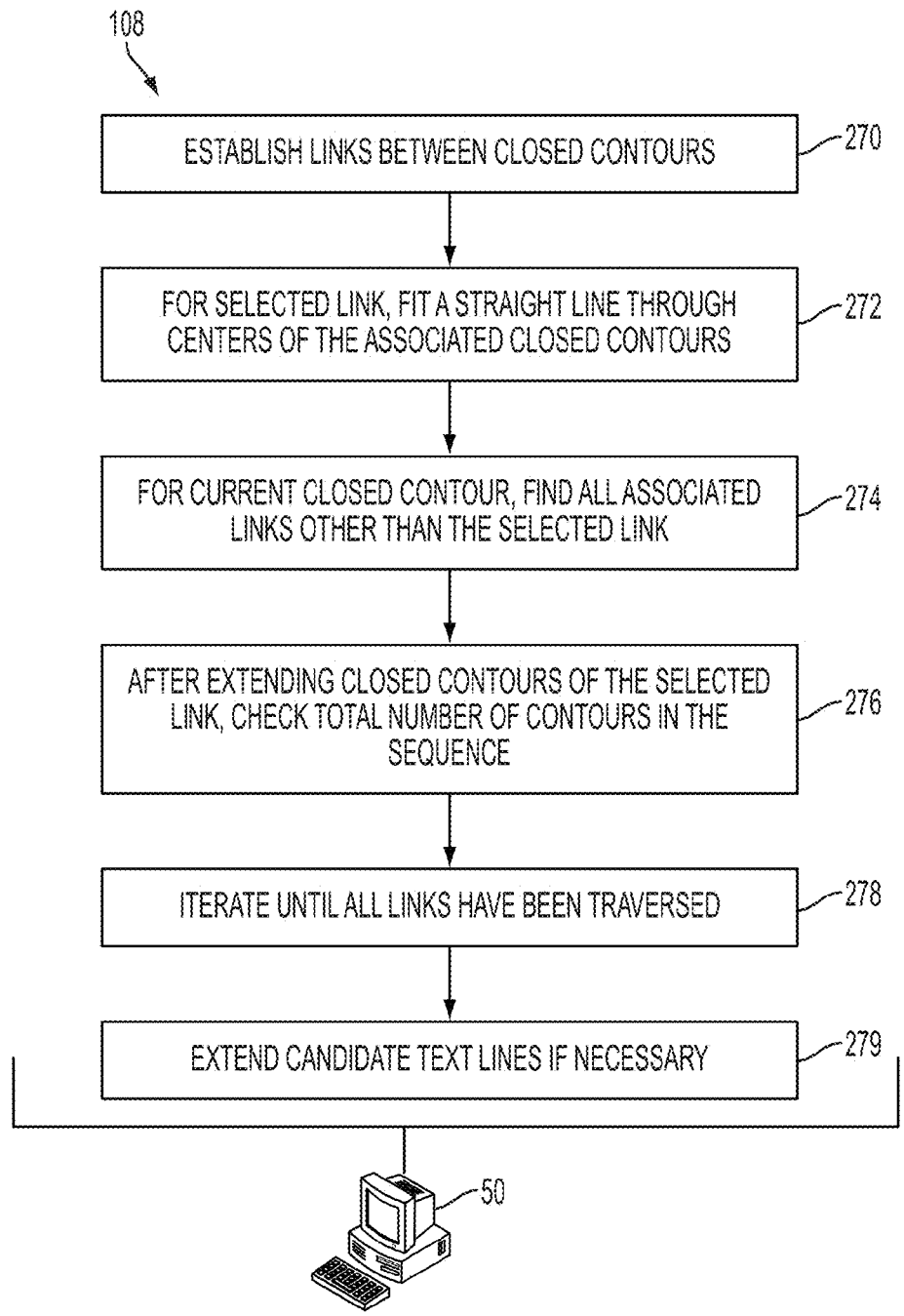
FIG. 13 illustrates a method for forming candidate text lines.

FIG. 13 illustrates a method for forming candidate text lines, such as is performed at 108 of the method of FIG. 1. The method is executed by the computer 50. At 270, links between the closed contours are established. Collinear links are extracted that are highly likely to belong to lines of text. To locate such lines, an exhaustive search strategy based on iteratively fitting a straight line with total least squares and applying a threshold on the distance to the line from the center of the closed contours being considered. Accordingly, at 272, a link is selected for consideration and a straight line is fit through the centers of the two associated closed contours. The link is extended from both contours, one after the other, by the following steps. For the current selected closed contour, all associated links are identified at 274 other than the link selected at 272. The corresponding contour attached to one of the associated links is selected, the center of which has the smallest distance to the previously fitted line. If the distance is also smaller than a pre-determined threshold $T_f$, the closed contour is added after the current contour to form a sequence of closed contours. The previously fitted line is also re-fitted by including the newly added contour. Furthermore, the newly added closed contour becomes the current contour, and the step is repeated, until the computed distance is larger than the predetermined threshold.

At 276, after both closed contours from the initially selected link have been extended, the total number of contours in sequence is checked. If a predetermined number (e.g., 4) or more contours are present, the sequence is then identified as a candidate text line. All closed contours in the sequence, and all links associated with the closed contours are then removed. At 278, the method (e.g., steps 272, 274, and 276) is iterated to consider another link, until all links have been traversed. At 279, Candidate text lines are extended, if desired.

Figure 14:
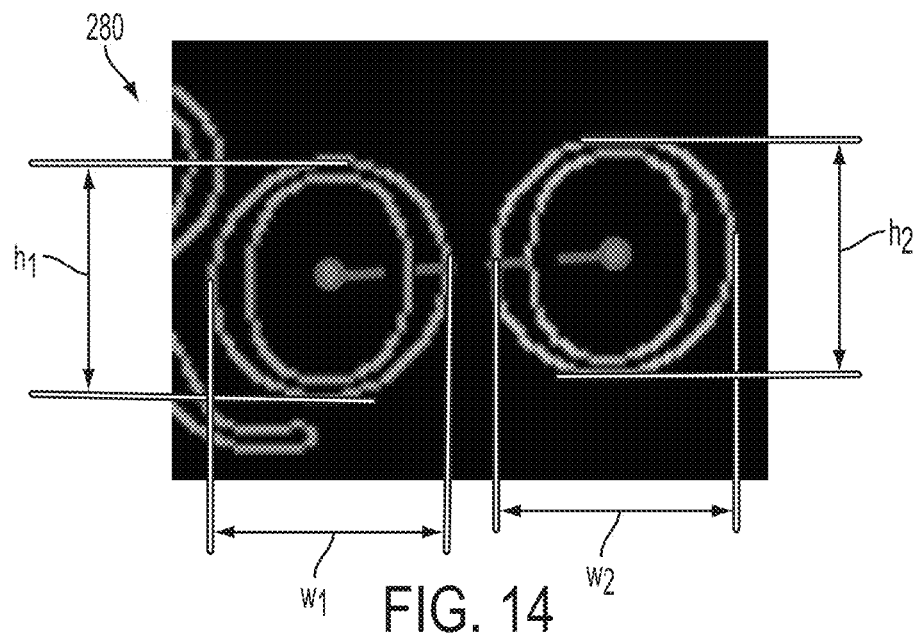
FIG. 14 illustrates additional detail related to establishing links between the closed contours.
Figure 15:
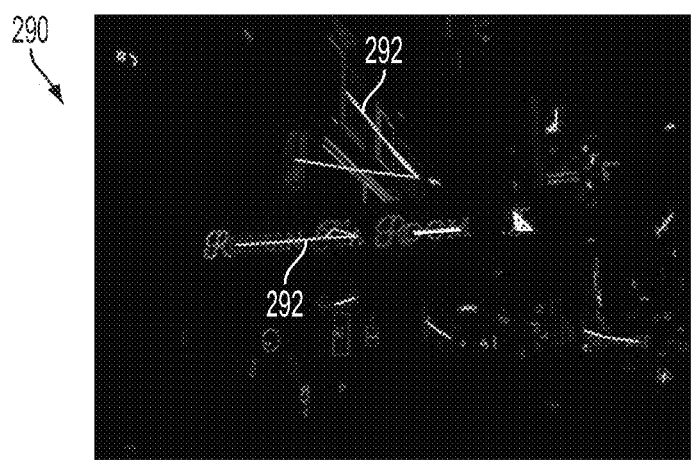
FIG. 15 illustrates an edge map in which closed contours that satisfy the aforementioned three criteria are linked.

FIGS. 14 and 15 illustrate additional details related to establishing links between the closed contours, such as is performed at 132 of the method of FIG. 2. With regard to FIG. 14, three criteria are evaluated before two closed contours can be linked in a portion of an edge map 280. First, a determination is made regarding whether the distance between centers of two closed contours is smaller than a threshold, $T_d$. How the threshold is determined is illustrated in FIG. 14. When considering two characters "O", the width and height for each character are $w_1$, $h_1$ and $w_2$, $h_2$, respectively. Then the formula for the threshold is given by:

$$T = \frac{1}{2}(w_1 + w_2) + \frac{1}{2}(h_1, h_2) \cdot m',$$

where m' is a positive multiplicative coefficient (e.g., 0.5 or some other predetermined coefficient). As can be observed in FIG. 14, the second term in the threshold formula, $\frac{1}{2}(h_1 + h_2) \cdot m'$, determines the gap between the two characters, and the gap threshold is set to be a multiple of the average heights.

Second, a threshold is applied on the ratio of the heights between the two characters, (e.g., 0.6 or some other predetermined threshold value. The following equation is evaluated for the second criterion:

$$\frac{\min(h_1, h_2)}{\max(h_1, h_2)} > T_h$$

The second criterion states that the heights of the two characters need to be comparable.

Finally, a constraint on color is implemented based on the assumption that the background pixels of neighboring closed contours or characters will be similar in a statistical sense, and likewise for text pixels. For each closed contour, the edge pixels are first dilated. Then a Gaussian mixture distribution with two modes is estimated on the chrominance channels of a luminance-chrominance color space of all pixels covered by the dilated contour. For example, the a* and b* channels of CIELAB space can be used. Next, an average of the Kullback-Leibler divergence between background modes and between text modes for the two characters is computed as below:

$$D_{color}(C_1, C_2) = \frac{1}{2}(KL(G_{1,1}, G_{2,1}) + KL(G_{1,2}, G_{2,2})),$$

where $C_1$ and $C_2$ represent any two closed contours/characters, while $G_{1,1}$, $G_{1,2}$ and $G_{2,1}$, $G_{2,2}$ are the background and text modes estimated for the two characters, respectively. The linkage between the two characters is retained if the distance D is within a threshold $T_c$ chosen to be 2 based on trial-and-error.

FIG. 15 illustrates an edge map 290 in which closed contours that satisfy the aforementioned three criteria are linked. Links 292 are shown in yellow. Specifically, the links are drawn between centers of closed contours with yellow solid lines.

Figure 16:
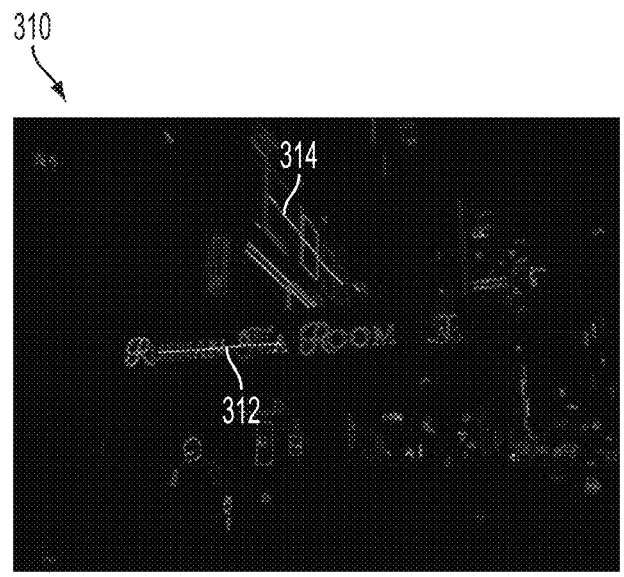
FIG. 16 illustrates an edge map with links established, wherein the link through the text characters has been selected as candidate text line.

FIG. 16 illustrates an edge map 310 with the links established in FIG. 14, wherein the link (282 in FIG. 14) through the text characters has been selected as candidate text line 312. In this particular case, all other spurious links have been removed, except that part of the text line "Russian Tea Room" and a false positive link 314 (link 284 in FIG. 14) caused by the several windows in the original image.

Figure 17:
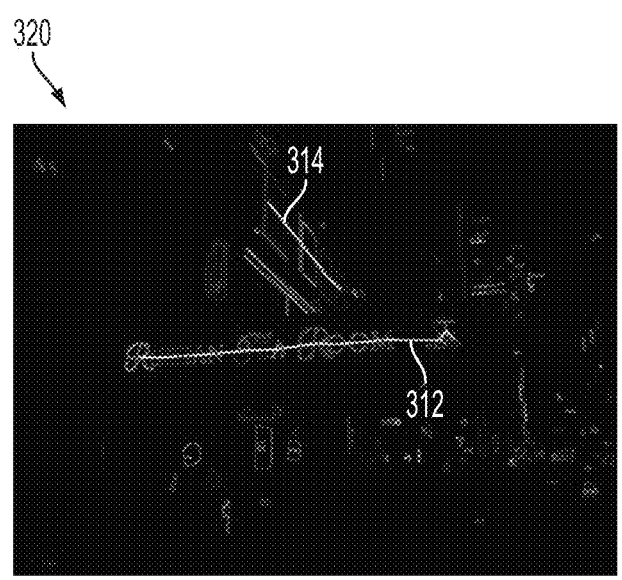
FIG. 17 illustrates an edge map in which the candidate text line has been extended through the remaining text character closed contours.

FIG. 17 illustrates an edge map 320 in which the candidate text line has been extended through the remaining text character closed contours, such as is performed at 298 of FIG. 15. For instance, the algorithm may only find a partial line of text, such as the candidate text line 312 (FIG. 16). Hence, at 298, the candidate text line 312 is extended from both ends. The extension by applying the same aforementioned strategy of linking closed contours and line fitting, but with relaxed threshold values for $T_d$, $T_h$, and $T_f$. Extending the candidate text line 312 in FIG. 16, the result shown in FIG. 17 is obtained. That is, the whole text line "Russian Tea Room" is picked up. The false positive text line 314 is still present in this example for illustrative purposes.

Figure 18:
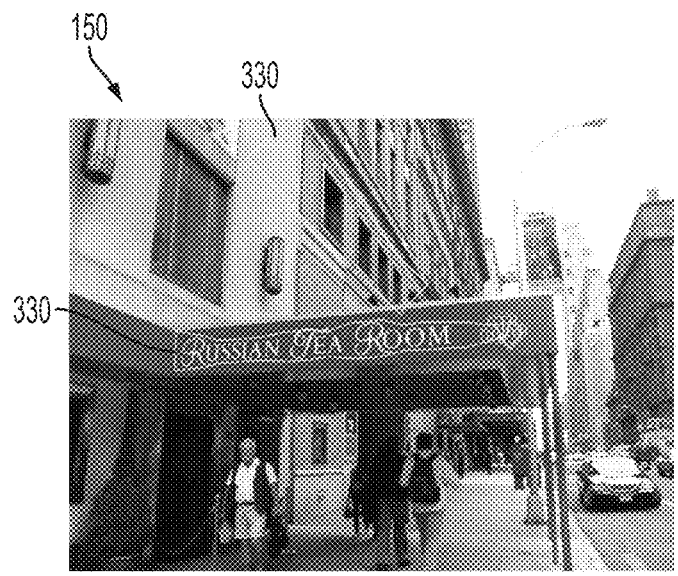
FIG. 18 illustrates the original image in which bounding polygons are shown in yellow as encompassing the candidate text strings of closed contours.

FIG. 18 illustrates the original image 150 in which bounding polygons 330 are shown in yellow as encompassing the candidate text strings of closed contours.

Figure 19:
FIG. 19 illustrates another example of an image in which a plurality of bounding polygons has been calculated.

FIG. 19 illustrates another example of an image 340 in which a plurality of bounding polygons 340 have been calculated.

Figure 20:
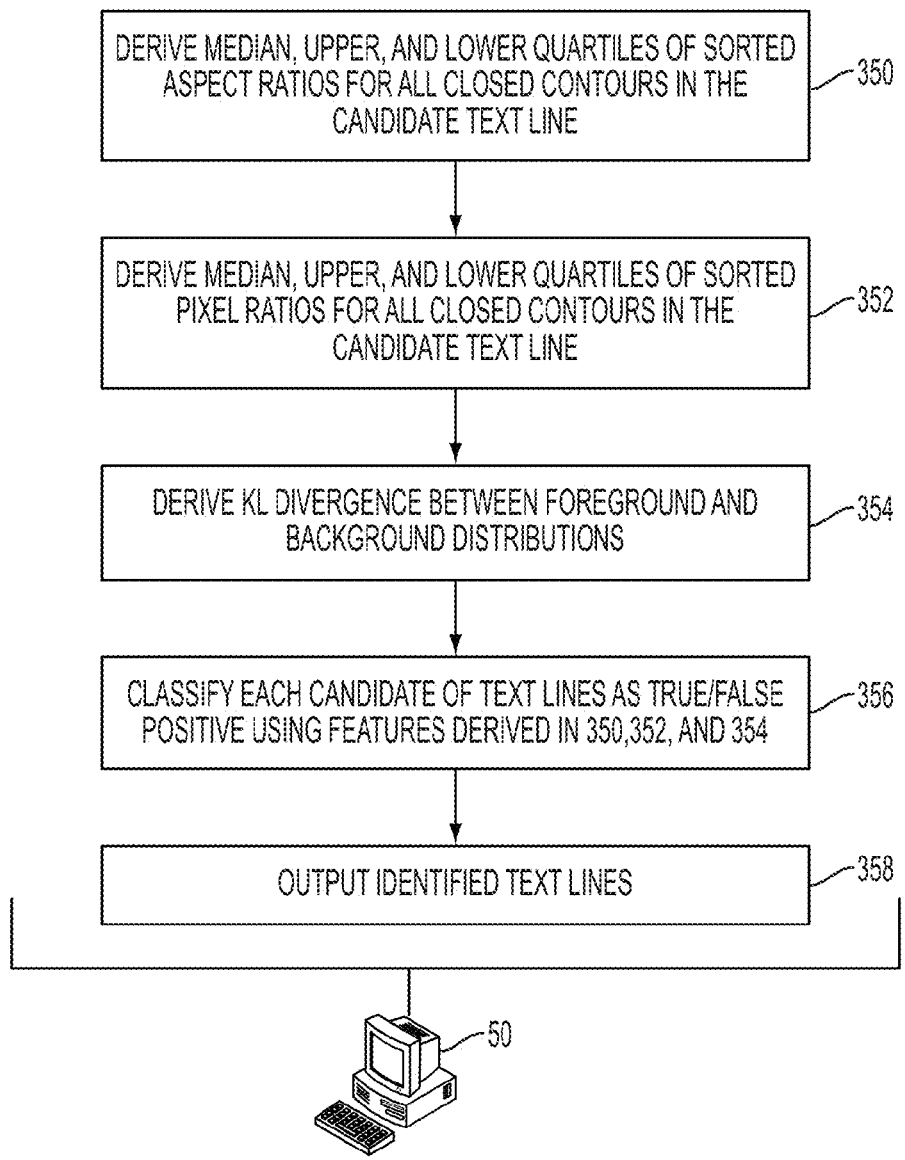
FIG. 20 illustrates a method for classifying candidate text lines, in which a classifier is applied to the detected text regions to further reduce the false alarm rate.

FIG. 20 illustrates a method for classifying candidate text lines, in which a classifier is applied to the detected text regions to further reduce the false alarm rate. The method is performed by a computer 50. A set of features are derived for the classifiers. At 350, median, upper and lower quartiles of the sorted aspect ratios for all closed contours in the candidate text line are derived. At 352, median, upper and lower quartiles of the sorted pixel ratios (e.g., a ratio of text pixels to background pixels) for all closed contours in the candidate text line are derived. At 354, a Kullback-Leibler (KL) divergence between the foreground and background Gaussian distributions (e.g., Gaussian distributions are estimated from foreground and background pixels, respectively) are derived. Using the foregoing information, at 356, the candidate text lines are classified as true or false positive for being text or non-text. At 358, the identified text lines are output.

Figure 21:
FIG. 21 illustrates an example of text characters that exhibit moderate aspect ratios and significant variation across closed contours.
Figure 22:
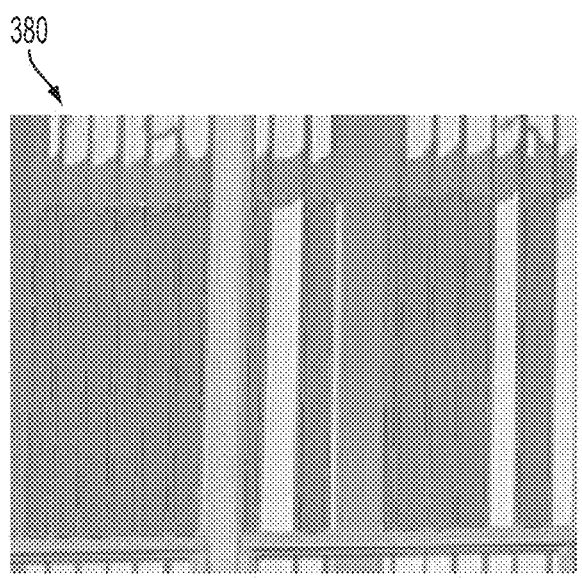
FIG. 22 illustrates a false positive text line in an image of vertical window blinds, wherein the closed contours exhibit very large aspect ratios with little variation.
Figure 23:
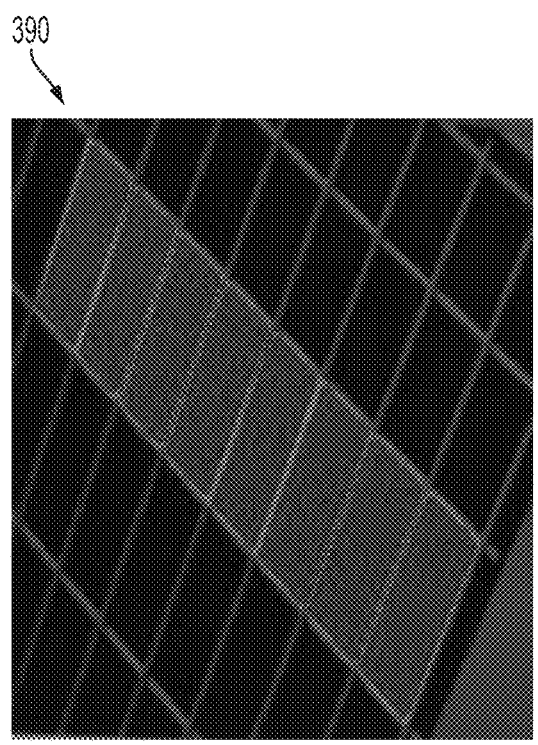
FIG. 23 illustrates a false positive text line, wherein the closed contours exhibit very large pixel ratios, i.e., "too compact", with little variation.

The heuristic for the aspect ratio feature determined at 350 is illustrated in FIG. 21. In FIG. 21, the text characters in "AVVIL" in the image 370 exhibit moderate aspect ratios and significant variation across closed contours (e.g. "I" has a much larger aspect ratio than "A"). In FIG. 22, the false positive image 380 of vertical window blinds exhibits very large aspect ratios with little variation across closed contours. The pixel ratio heuristic is also illustrated in FIG. 23. The true text "AVVIL" is not very compact, and has many background pixels filled in between strokes, while the contours in the image 390 in FIG. 23 are very compact. As a result, the true text has mid-range pixel ratios with variation, while other false positives typically exhibit much larger pixel ratios. Finally, the KL divergence derived at 354 measures the contrast between the background and text modes, and this is helpful in screening out some false alarms due to textures that typically exhibit lower contrast.

The features determined at 350, 352, and 354 are fed to a classifier at 356 that classifies the candidate text lines as text or non-text. Any suitable classifier can be utilized in this regard. In one example, a logistic regression classifier (also used in the region classification in U.S. application Ser. No. 13/349,751) is used. In another example, an adaptive logistic regression classifier is used, which can be viewed as a "boosted" version of logistic regression.

It will be understood that the foregoing methods, techniques, procedures, etc., are executable by a computer, a processor, or the like, such as the computer 50 described herein and/or the processor (not shown) comprised thereby and described with regard thereto.

The exemplary embodiments have been described with reference to the preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A computer-implemented method for automatically detecting text in electronic images of natural scenes, comprising:
   receiving an electronic image for analysis;
   performing an edge-detection algorithm on the electronic image;
   identifying closed contours in the electronic image as a function of detected edges;
   establishing links between closed components;
   identifying candidate text lines as a function of the identified closed contours;
   classifying candidate text lines as being text regions or non-text regions; and
   outputting, via a graphical user interface (GUI), the text regions in the electronic image to a user;
   wherein identifying candidate text lines further comprises:
      selecting a link for consideration;
      fitting a line that connects respective centers of first and second closed contours connected by the link;
      for each of the first and second closed contours, identifying all associated links other than the selected link, wherein a third closed contour attached to one of the associated links is selected;
      re-fitting the fitted line by including newly added third closed contour, wherein the refitted line connects the centers of the first, second, and third closed contours; and
      iterating the preceding steps until all closed contours having a center with a distance less than the predetermined threshold $T_f$ have been added to the candidate text line.

2. The method according to claim 1, wherein identifying closed contours in the electronic image further comprises:
   identifying open tips of potential closed contours;
   connecting any two open tips that are separated by a distance smaller than a threshold $T_{open}$ to form an edge;
   eroding any remaining open tips until no open tips remain in the potential closed contours;
   outputting one or more closed contours.

3. The method according to claim 2, further comprising:
   detecting one or more falsely-connected closed contours; and
   disconnecting the one or more falsely connected closed contours.

4. The method according to claim 3, wherein disconnecting the one or more falsely connected closed contours further comprises:
   executing a connected component algorithm to differentiate between edge pixels that border a closed component and edge pixels that separate two background pixel regions; and
   removing edge pixels that separate two background pixel regions and do not border a closed component.

5. The method according to claim 1, wherein establishing links between closed components further comprises:
   determining whether a distance between centers of two closed contours is smaller than a first threshold, $T_d$;
   applying a second threshold to a ratio of the heights between the two closed contours; and
   applying a constraint on pixel color whereby background pixels of neighboring closed contours are similar to each other and text pixels are similar to each other.

6. The method according to claim 5, further comprising:
   dilating edge pixels of each closed contour;
   estimating a Gaussian mixture distribution with two modes on the chrominance channels in a luminance-chrominance color space of all pixels covered by a dilated contour;
   computing an average of a Kullback-Leibler divergence between background modes and between text modes for the two closed contours such that:

$$D_{color}(C_1,C_2)=\tfrac{1}{2}(KL(G_{1,1},G_{2,1})+KL(G_{1,2},G_{2,2})),$$

where $C_1$ and $C_2$ represent any two closed contours, while $G_{1,1}$, $G_{1,2}$ and $G_{2,1}$, $G_{2,2}$ are the background and text modes estimated for the two closed contours, respectively; and
   retaining a linkage between the two closed contours if the distance $D_{color}$ is within a threshold $T_c$.

7. The method according to claim 1, wherein the second closed contour has a center with a smallest distance to the fitted line relative to other closed contours, wherein if the distance to the fitted straight line is also smaller than a predetermined threshold $T_f$, the second closed contour is added after the first closed contour to form a sequence of closed contours.

8. The method according to claim 7, further comprising:
   after the two closed contours from the initially selected link have been extended, evaluating a total number of closed contours in the candidate text line; and
   verifying that the candidate text line is a candidate text line if at least a predetermined number of closed contours are present in candidate text line.

9. The method according to claim 8, wherein the verified text regions in the electronic image are output to a user via a graphical user interface (GUI), verified text regions in the electronic image.

10. The method according to claim 1, wherein classifying candidate text lines as being text or non-text regions further comprises:
    calculating median, upper, and lower quartiles of sorted aspect ratios for all closed contours in the candidate text line;
    calculating median, upper, and lower quartiles of text-to-background pixel ratios for all closed contours in the candidate text line;
    calculating a Kullback-Leibler divergence between a foreground pixel Gaussian distribution for text pixels in each candidate text line and a background pixel Gaussian distribution for background pixels in each candidate text line;
    classifying the candidate text lines as text regions or non-text regions as a function the Kullback-Leibler divergence; and
    outputting text regions in the image to a user.

11. A computerized system that facilitates automatically detecting text in electronic images of natural scenes, comprising:
    a memory that stores computer-executable instructions; and
    a processor configured to execute the instructions, the instructions comprising:

receiving an electronic image for analysis;

performing an edge-detection algorithm on the electronic image;

identifying closed contours in the electronic image as a function of detected edges;

establishing links between closed components;

identifying candidate text lines as a function of the identified closed contours;

classifying candidate text lines as being text regions or non-text regions; and a graphical user interface (GUI) via which the text regions in the electronic image are displayed to a user;

wherein the instructions for identifying candidate text lines further comprise instructions for:

selecting a link for consideration;

fitting a line that connects respective centers of first and second closed contours connected by the link;

for each of the first and second closed contours, identifying all associated links other than the selected link, wherein a third closed contour attached to one of the associated links is selected;

re-fitting the fitted line by including newly added third closed contour, wherein the refitted line connects the centers of the first, second, and third closed contours; and iterating the preceding steps until all closed contours having a center with a distance less than the predetermined threshold $T_f$ have been added to the candidate text line.

12. The system according to claim 11, wherein the instructions for identifying closed contours in the electronic image further comprise instructions for:

identifying open tips of potential closed contours;

connecting any two open tips that are separated by a distance smaller than a threshold $T_{open}$ to form an edge;

eroding any remaining open tips until no open tips remain in the potential closed contours;

outputting one or more closed contours.

13. The system according to claim 12, wherein the memory stores and the processor is configured to execute computer-executable instructions for:

detecting one or more falsely-connected closed contours; and disconnecting the one or more falsely connected closed contours.

14. The system according to claim 13, wherein the instructions for disconnecting the one or more falsely connected closed contours further comprise instructions for:

executing a connected component algorithm to differentiate between edge pixels that border a closed component and edge pixels that separate two background pixel regions; and removing edge pixels that separate two background pixel regions and do not border a closed component.

15. The system according to claim 11, wherein the instructions for establishing links between closed components further comprises:

determining whether a distance between centers of two closed contours is smaller than a first threshold, $T_d$;

applying a second threshold to a ratio of the heights between the two closed contours; and applying a constraint on pixel color whereby background pixels of neighboring closed contours are similar to each other and text pixels are similar to each other.

16. The system according to claim 15, wherein the memory stores and the processor is configured to execute computer-executable instructions for:

dilating edge pixels of each closed contour;

estimating a Gaussian mixture distribution with two modes on the chrominance channels in a luminance-chrominance color space of all pixels covered by a dilated contour;

computing an average of a Kullback-Leibler divergence between background modes and between text modes for the two closed contours such that:

$$D_{color}(C_1,C_2)=\frac{1}{2}(KL(G_{1,1},G_{2,1})+KL(G_{1,2},G_{2,2})),$$

where $C_1$ and $C_2$ represent any two closed contours, while $G_{1,1}$, $G_{1,2}$ and $G_{2,1}$, $G_{2,2}$ are the background and text modes estimated for the two closed contours, respectively; and retaining a linkage between the two closed contours if the distance $D_{color}$ is within a threshold $T_c$.

17. The system according to claim 11, wherein the second closed contour has a center with a smallest distance to the fitted line relative to other closed contours, wherein if the distance to the fitted straight line is also smaller than a predetermined threshold $T_f$, the second closed contour is added after the first closed contour to form a sequence of closed contours.

18. The system according to claim 17, wherein the memory stores and the processor is configured to execute computer-executable instructions for:

after the two closed contours from the initially selected link have been extended, evaluating a total number of closed contours in the candidate text line; and verifying that the candidate text line is a candidate text line if at least a predetermined number of closed contours are present in candidate text line.

19. The system according to claim 11, wherein the instructions for classifying candidate text lines as being text or non-text regions further comprise instructions for:

calculating median, upper, and lower quartiles of sorted aspect ratios for all closed contours in the candidate text line;

calculating median, upper, and lower quartiles of text-to-background pixel ratios for all closed contours in the candidate text line;

calculating a Kullback-Leibler divergence between a foreground pixel Gaussian distribution for text pixels in each candidate text line and a background pixel Gaussian distribution for background pixels in each candidate text line;

classifying the candidate text lines as text regions or non-text regions as a function the Kullback-Leibler divergence; and outputting text regions in the image to a user.

* * * * *